US011153883B1

(12) United States Patent
Yang et al.

(10) Patent No.: US 11,153,883 B1
(45) Date of Patent: Oct. 19, 2021

(54) METHOD TO AVOID FLOODING CONTROL CHANNEL AFTER SYSTEM-WIDE CALL ENDS

(71) Applicant: MOTOROLA SOLUTIONS, INC., Chicago, IL (US)

(72) Inventors: Yunhai Yang, Elgin, IL (US); Myo Tun Oo, Elgin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 64 days.

(21) Appl. No.: 16/835,354

(22) Filed: Mar. 31, 2020

(51) Int. Cl.
*H04W 72/04* (2009.01)

(52) U.S. Cl.
CPC ... *H04W 72/0486* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 5,898,928 A * | 4/1999 | Karlsson | H04W 16/04 455/450 |
| 6,842,428 B2 | 1/2005 | Chen et al. | |
| 7,752,323 B2 * | 7/2010 | Linares | H04L 47/2458 709/230 |
| 2004/0022207 A1 * | 2/2004 | Leung | H04W 52/24 370/321 |
| 2008/0049912 A1 * | 2/2008 | Carter | H04M 3/53391 379/88.22 |
| 2012/0083266 A1 * | 4/2012 | Vanswol | H04W 8/04 455/433 |
| 2016/0234828 A1 * | 8/2016 | Smith | H04W 4/90 |

* cited by examiner

*Primary Examiner* — Kodzovi Acolatse
(74) *Attorney, Agent, or Firm* — John B. MacIntyre; Barbara R. Doutre

(57) ABSTRACT

A method and system to avoid flooding a control channel after the end of a system-wide call is provided. A Land Mobile Radio (LMR) site tracks active channel assignments. The LMR site also receives a system-wide call request. Upon receiving the system-wide call request, a snapshot of the channel assignments is taken. When the LMR site receives an indication that the system wide call request has ended, the LMR site receives a de-assign complete message.

14 Claims, 4 Drawing Sheets

METHOD TO AVOID FLOODING CONTROL CHANNEL AFTER SYSTEM-WIDE CALL ENDS

BACKGROUND OF THE INVENTION

To make a system-wide call in a Land Mobile Radio (LMR) system, the LMR system preempts all active traffic services except for emergency calls. The preempted traffic services include IVD (Integrated Voice and Data) and ED (Enhanced Data) traffic.

The end of a system-wide call acts as a synchronized trigger for all communication devices to resume their data services. This includes, for example, previously interrupted IVD inbound data and queued ED data. Since there are no data channels available, all the communication devices will send a data channel request over a Control Channel (CC), which will cause control channel inbound collisions and outbound queuing delays. In addition, high priority voice call requests may not get in to the LMR system, or may not be responded to in time because of delays.

Therefore a need exists for a method and system to avoid flooding the control channel requests after a system wide call ends.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in and form part of the specification and serve to further illustrate various exemplary embodiments of concepts that include the claimed invention, and to explain various principles and advantages of those exemplary embodiments.

Figure 1:
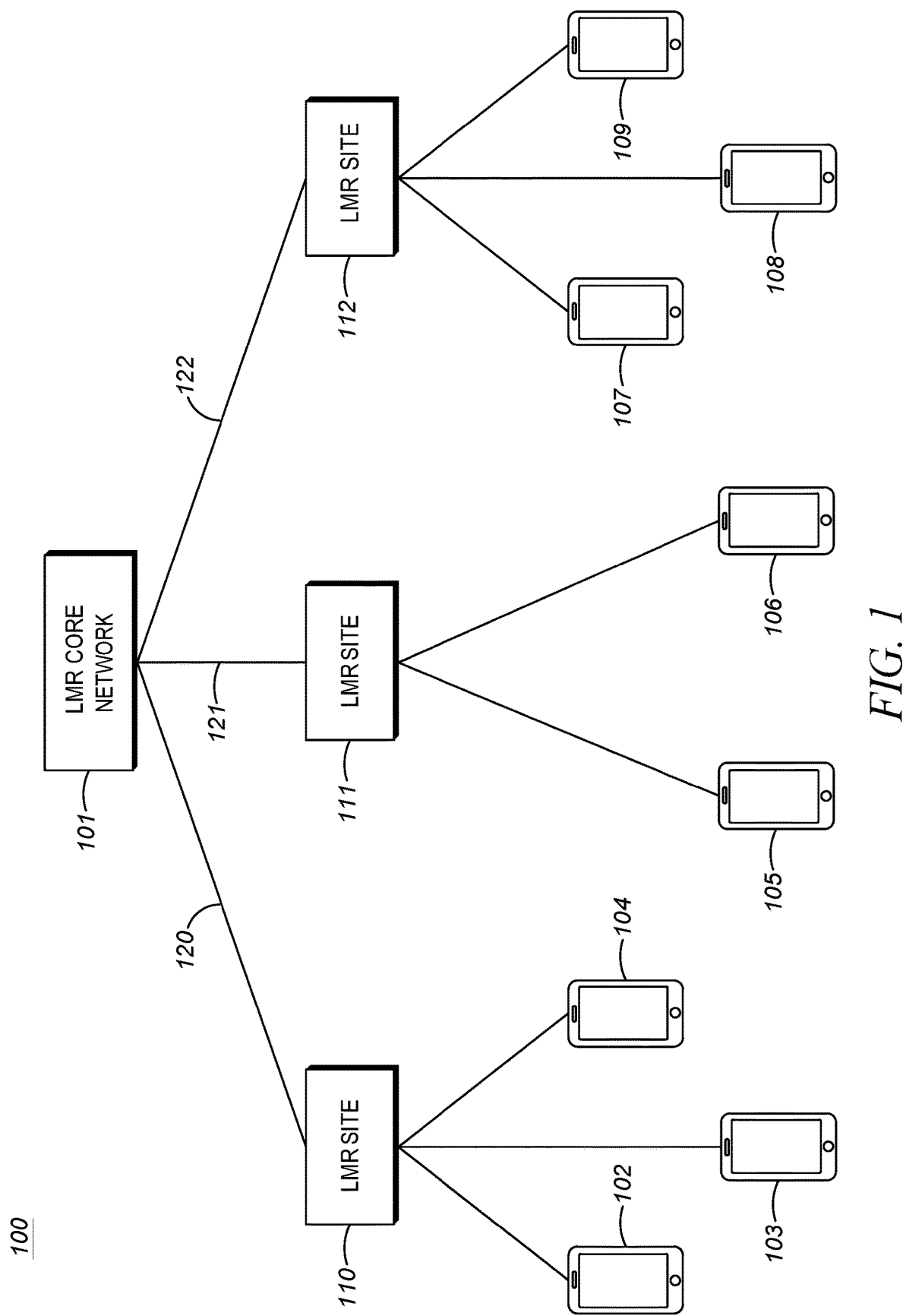
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

An exemplary embodiment provides solutions to avoid flooding a control channel after a system-wide call ends. In accordance with an exemplary embodiment, a Zone Controller (ZC) in an LMR Core Network tracks all active IVD and ED channel assignments. This is preferably an ongoing process. Each LMR site tracks active IVD and ED channel assignments. When a system-wide call request is received at each LMR site, the LMR site takes a snapchat of current channel assignments.

In accordance with an exemplary embodiment, when the system-wide call ends, each LMR site receives a de-assign complete message that indicates that the system-wide message has ended.

In accordance with an exemplary embodiment, each LMR site goes through a similar process, which is described below. If there are no protected data channels, meaning that there are no channels that have been protected for certain calls, the data channel assignments snapshot is used to assign channels to each of the data channel assignments that were in existence when the system-wide call started. If there are protected data channels, the LMR site assigns the minimum of the snapshot of the data channel assignments and protected channel count configuration.

In an exemplary embodiment, regardless of the whether there were protected data channels or not, each LMR site receives a data channel grant. If an infrastructure initiated flag is set, the LMR site broadcasts a data channel assignment. A communication device with inbound data moves to a random data channel with autonomous access enabled. An data channel that are not assigned are released to be utilized for new calls.

In a further exemplary embodiment, this solution can be used in a site recovery scenario where multiple sites that are adjacent to each other fail and one of the sites in this adjacent site cluster recovers. Communication devices at the adjacent sites that are still in site trunking will register at the newly recovered wide-trunking site and may attempt IVD/ED requests, such as a potential control channel inbound collision scenario. In accordance with an exemplary embodiment, a ZC is aware of the adjacent site list of the newly recovered sites and the wide-trunking status of these adjacent sites. In addition, the ZC also is aware of the protected data count of the sites. The ZC preferably estimates the number of expected IVD/ED data channels and sends IVD/ED data grants to the newly recovered site based multiple factors. These factors include the number of sites that are still in site-trunking at the adjacent sites of the newly recovered site, the protected data count at each site, and the grants of the IVD/ED data channels after site recovery.

In a further exemplary embodiment, this solution extends to the scenario when RF (Radio Frequency) sites that are part of a trunking subsystem (Tsub) ZC and that are in wide-trunking with the Tsub ZC are transitioned to wide-trunking with a core ZC. A number of RF sites are preferably configured as a part of a Tsub ZC, and both the core ZC and a Tsub ZC send adjacent site announcements on the site recovery based on the number of RF sites and console sites that are currently wide-trunking with a Core ZC/Tsub ZC. Configured RF sites in a Tsub are a part of a calculation for anticipated data requests and send IVD/ED data grants upon recovery to a core ZC.

Each of the above-mentioned embodiments will be discussed in more detail below, starting with example system and device architectures of the system in which the embodiments may be practiced, followed by an illustration of processing blocks for achieving an improved technical method, device, and system for allowing communication devices to re-establish calls after being preempted by a system-wide call without flooding or overloading the control channel. Exemplary embodiments are herein described with reference to flowchart illustrations, call flow diagrams, and/ or block diagrams of methods, apparatus (systems) and computer program products according to exemplary embodiments. It will be understood that each block of the flowchart illustrations, call flow diagrams, and/or block diagrams, and combinations of blocks in the flowchart illustrations, call flow diagrams, and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart, call flow, and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 depicts a system diagram of a communication system 100 in accordance with an exemplary embodiment of the present invention. Communication system 100 includes a Land Mobile Radio (LMR) Core 101, LMR Site 110, LMR Site 111, LMR Site 112, and communication devices 102-109. Communication devices 102-109 are sometimes referred to as subscriber units. Although only three LMR Sites 110-112 are depicted in FIG. 1, it should be understood that a typical communication system 100 would include a plurality of sites, and that communication devices 102-109 could move about and connect to multiple of these plurality of sites as registered sites and adjacent sites.

Connection 120 preferably connects LMR Site 110 and LMR Core Network 101 and this connection is preferably an ALSLIP (Application Layer Site Link Interface Protocol) interface. The ALSLIP interface connects a site controller of LMR Site 110 to the site's Zone Controller located within LMR Core Network 101.

Connection 121 preferably connects LMR Site 111 and LMR Core Network 101 and this connection is preferably an ALSLIP interface. The ALSLIP interface connects a site controller of LAIR Site 111 to the site's Zone Controller located within LMR Core Network 101.

Connection 122 preferably connects LMR Site 112 and LMR Core Network 101 and this connection is preferably an ALSLIP interface. The ALSLIP interface connects a site controller of LMR Site 112 to the site's Zone Controller located within LMR Core Network 101.

LMR Core Network 101 preferably includes multiple sites in addition to LMR Sites 110-112, although only three sites are shown in FIG. 1 for clarity. LMR Core Network 101 preferably includes a Zone Controller (ZC), a PM, a Unified Endpoint Management (UEM), and a Link Management Protocol (LMP). LMR Core 101 also preferably includes a Mobility Management Entity (MME) that is in charge of functions related to end-user authentication and a deployable home subscriber server for storing user-related and subscription-related information to LMR Core 101 to successfully complete network entry authentication of communication devices.

LMR Sites 110-112 handle data traffic and each include a network of base stations (not shown), each of which functions as a base station for LMR Core Network 101. LMR Sites 110-112 use the base stations to forward user data and signaling between LMR Core Network 101 and communication devices 102-109.

Communication devices 102-109 are preferably portable electronic communication devices that can be used for sending voice or data to other communication devices.

Figure 2:
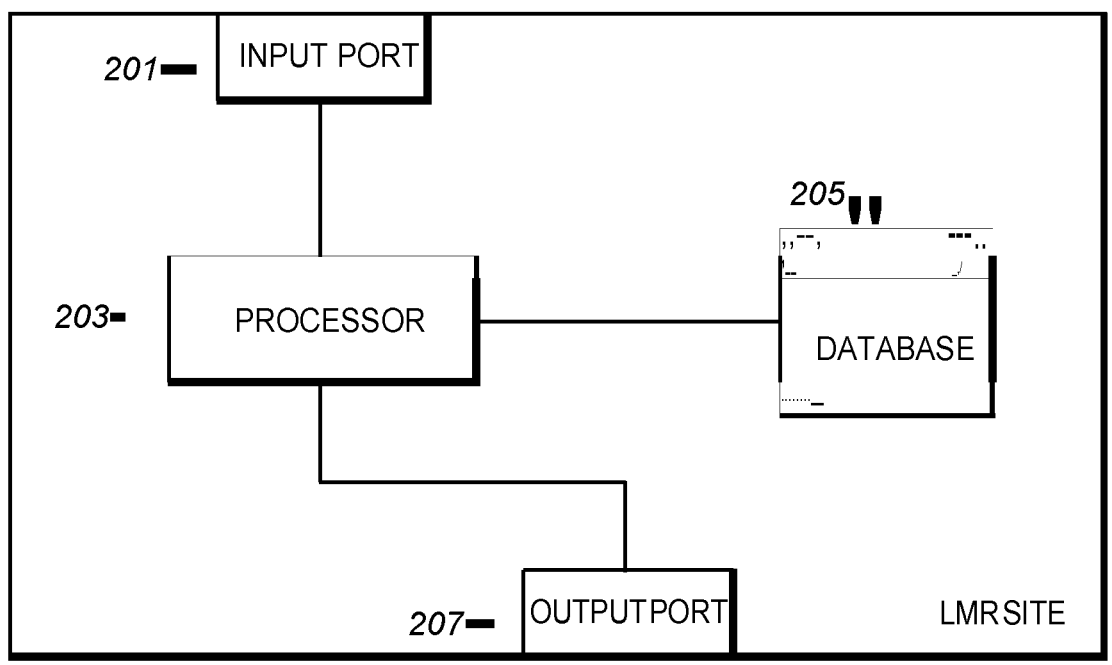
FIG. 2 depicts a schematic diagram of a backup bearer gateway in accordance with an exemplary embodiment of the present invention.

FIG. 2 depicts a schematic diagram of LMR Site 110 in accordance with an exemplary embodiment of the present invention. In the exemplary embodiment depicted in FIG. 2, LMR Site 110 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals and messages from LMR Core Network 101 and communication devices 102-104. Output port 207 transmits signals and messages to LMR Core Network 101 and communication devices 102-104. Input port 201 and output port 207 are electrically connected to processor 203. Although depicted in FIG. 2 as two separate elements, input port 201 and output port 207 can be a single element.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium. The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the methods of FIG. 3 and FIG. 4.

Figure 3:
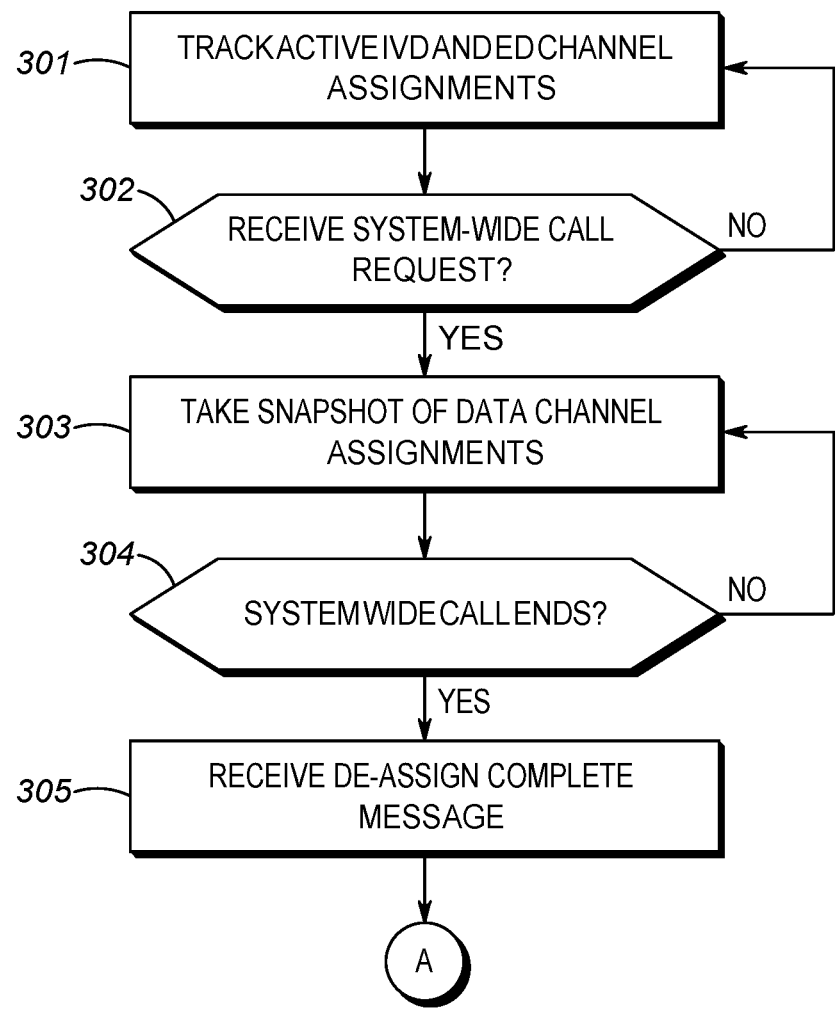
FIG. 3 depicts a flow diagram in accordance with an exemplary embodiment of the present invention.

FIG. 3 depicts a flow chart 300 of a method to avoid inbound request flooding for synchronized data service recovery due to large scale service interruption in accordance with an exemplary embodiment of the present invention.

LMR Site 110 tracks (301) the active IVD and ED channel assignments. LMR Site 110 preferably keeps tracking the real time count of the active IVD and ED channels assignment with Data Access Group's (DAG) usage. In accordance with an exemplary embodiment, a Zone Controller (ZC) has the real time information and a Data Transition Stream (DTS) has the historical information for traffic prediction in the situation where there is a relatively long period of service interruption.

LMR Site 110 determines (302) if it has received a system-wide call request. If no system-wide call request has been received, LMR Site 110 goes back to tracking the active IVD and ED channel assignments at step 301.

If LMR Site 110 determines at step 302 that a system-wide call request has been received, a zone controller at LMR Core Network 101 takes (303) a snapshot of the data channel assignments. In accordance with an exemplary embodiment, the zone controller takes a snapshot of data channel assignment counts for each site, for example IVD channels and ED channel assignments with DAGs usage.

LMR Site 110 determines (304) if the system-wide call has ended. If the system-wide call has not ended, LMR Site 110 goes back to step 303 and continues to take snapshots of the data channel assignments.

If LMR Site 110 determines at step 204 that the system-wide call has ended, LMR Site 110 receives (305) a de-assign complete message. The process then continues in FIG. 4.

Figure 4:
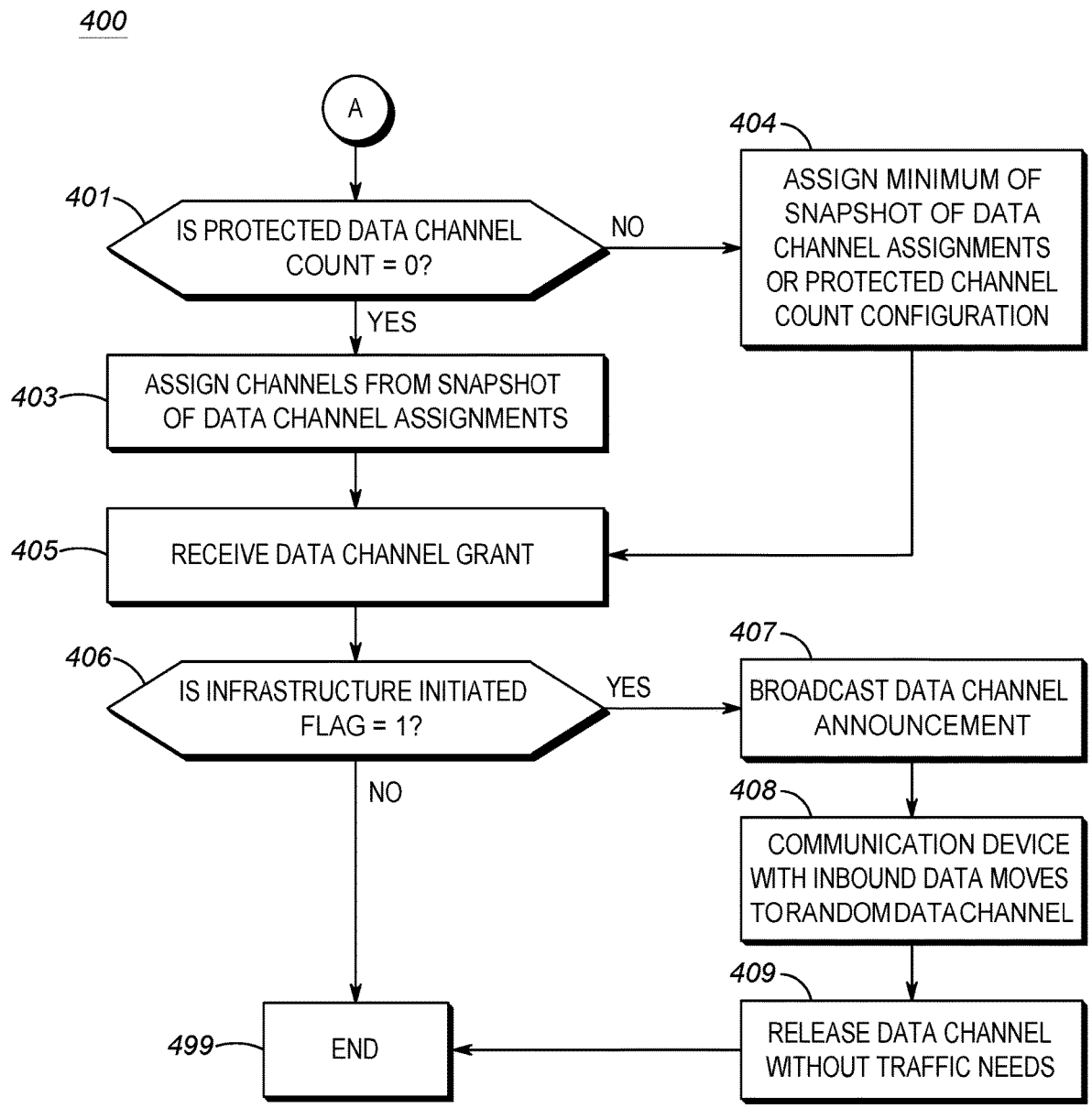
FIG. 4 depicts a flow diagram in accordance with an exemplary embodiment of the present invention.

FIG. 4 depicts a flow chart 400 of a method to avoid inbound request flooding for synchronized data service recovery due to large scale service interruption in accordance with an exemplary embodiment of the present invention. In this exemplary embodiment, the infrastructure proactively assigns the number of IVD and ED channels. FIG. 4 picks up after an LMR Site receives a de-assign complete message, as depicted in step 305 of FIG. 3. As in FIG. 3, the steps of FIG. 4 are depicted as they occur in a single LMR Site, in this case LMR Site 110. In an exemplary embodiment, these steps occur in all LMR Sites.

LMR Site 110 determines (401) if the protected data channel count equals zero. If the protected data channel count equals zero, which indicates that the proactively allocated data channels can be preempted, the Zone Controller within LMR Core 101 assigns (403) channels from the snapshot of data channel assignments. In an exemplary embodiment, the snapshot of data channel assignments comprises a snapshot of IVD and consolidated ED channels.

If the Zone Controller determines at step 401 that the protected data channel count is not equal to zero, which indicates that not all protected data channels can be preempted, it assigns (404) the lower of the snapshot of data channel assignments or the protected channel count configuration. In an exemplary embodiment, the snapshot of data channel assignments comprises a snapshot of IVD and consolidated ED channels, where the consolidated ED channels means loading each ED up to 120% level to cover all DAGs. In accordance with an exemplary embodiment, the ZC predicts the data load based on historical traffic during the system-wide call. The infrastructure preferably uses the predicted channel needs and the snapshot to determine how many data channels should be proactively assigned at the end of the system-wide call.

After the channels are assigned in either step 403 or step 404, LMR Site 110 receives (405) a data channel grant.

LMR Site 110 could alternately receive multiple data channel grants. The data channel grant is preferably a ALSLIP message. The data channel grant preferably includes an Infrastructure Initiated Flag, which can be set to "1" to signal the proactive data allocation initiated by the infrastructure for recovery.

LMR Site 110 examines (406) if the Infrastructure Initiated Flag in the data channel grant is set to "1". If not, the process ends (499).

If the Infrastructure Initiated Flag is set to "1" as determined at step 406, LMR Site 110 broadcasts (407) a data channel announcement. In accordance with an exemplary embodiment, LMR Site 110 starts broadcasting data channel announcement immediately. LMR Site 110 preferably ignores the data channel grant if the request is initiated by a different LMR Site. LMR Site 110 can send the data channel announcement as a priority monitor message via a system-wide call voice channel.

A communication device with inbound data moves (408) to a random data channel. In accordance with an exemplary embodiment, a communication device with inbound data moves to a random data channel via autonomous access without sending the request via a control channel.

LMR Site 110 releases (409) a data channel without traffic needs. This data channel is preferably released back to the free resource pool after the hangtime expires. The process then ends (499).

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot send unicast messages to each of the talkgroup members connected to a broadband network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

We claim:

1. A method to avoid flooding a control channel after the end of a system-wide call, the method comprising:
   tracking active channel assignments at a Land Mobile Radio (LMR) site; receiving a system-wide call request at the LMR site;
   taking a snapshot of the channel assignments upon receiving the system-wide call request; receiving an indication that the system-wide call request has ended;
   receiving a de-assign complete message at the LMR site,
   assigning, in response to there being no protected channels, channels from the snapshot of the channel assignments; and
   assigning, in response to there being protected channels, channels equal to a minimum of the snapshot of the channel assignments or a protected channel count configuration.

2. The method of claim 1, the method further comprising broadcasting a data channel assignment.

3. The method of claim 2, the method further comprising moving a communication device with inbound data to a random data channel.

4. The method of claim 2, the method further comprising releasing unassigned data channels.

5. The method of claim 1, wherein the active channel assignments are Integrated Voice and Data (IVD) channels.

6. The method of claim 1, wherein the active channel assignments are Enhanced Data (ED) channels.

7. The method of claim 1, the method further comprising the step of predicting cumulative data traffic needs during the system-wide call.

8. A Land Mobile Radio (LMR) site comprising:

a processor for tracking active channel assignments at a Land Mobile Radio (LMR) site;

an input port for receiving a system-wide call request at the LMR site;

wherein the processor is further configured for taking a snapshot of the channel assignments upon receiving the system-wide call request; and wherein the input port is further configured for: receiving an indication that the system-wide call request has ended; receiving a de-assign complete message at the LMR site;

assigning, in response to there being no protected channels, channels from the snapshot of the channel assignments; and assigning, in response to there being protected channels, channels equal to a minimum of the snapshot of the channel assignments or a protected channel count configuration.

9. The LMR site of claim 8, the LMR site further comprising an output port for broadcasting a data channel assignment.

10. The LMR site of claim 9, wherein the processor is further configured for moving a communication device with inbound data to a random data channel.

11. The LMR site of claim 9, wherein the processor is further configured for releasing unassigned data channels.

12. The LMR site of claim 8, wherein the active channel assignments are Integrated Voice and Data (IVD) channels.

13. The LMR site of claim 8, wherein the active channel assignments are Enhanced Data (ED) channels.

14. The LMR site of claim 8, wherein the processor is further configured for predicting cumulative data traffic needs during the system-wide call.

* * * * *